(12) United States Patent
Schmidt et al.

(10) Patent No.: US 7,046,534 B2
(45) Date of Patent: May 16, 2006

(54) DC/AC CONVERTER TO CONVERT DIRECT ELECTRIC VOLTAGE INTO ALTERNATING VOLTAGE OR INTO ALTERNATING CURRENT

(75) Inventors: Heribert Schmidt, Emmendingen (DE); Christoph Siedle, Freiburg (DE); Jürgen Ketterer, Buchenbach (DE)

(73) Assignee: Fraunhofer-Gesellschaft zur Förderung der angewandten Forschung e. V., München (DE)

( * ) Notice: Subject to any disclaimer, the term of this patent is extended or adjusted under 35 U.S.C. 154(b) by 180 days.

(21) Appl. No.: 10/773,155

(22) Filed: Feb. 9, 2004

(65) Prior Publication Data

US 2005/0174817 A1    Aug. 11, 2005

(51) Int. Cl.
*H02M 7/5387* (2006.01)
(52) U.S. Cl. .................................... 363/132; 363/98
(58) Field of Classification Search ............. 363/16, 363/17, 97, 98, 131, 132
See application file for complete search history.

(56) References Cited

U.S. PATENT DOCUMENTS 4,446,513 A * 5/1984 Clenet ........................ 363/132
5,017,800 A * 5/1991 Divan ........................... 307/66
6,330,170 B1 * 12/2001 Wang et al. .................. 363/37
6,605,976 B1 * 8/2003 Middel et al. .............. 327/423

FOREIGN PATENT DOCUMENTS

JP    7-337036    * 12/1995

* cited by examiner

*Primary Examiner*—Matthew V. Nguyen
(74) *Attorney, Agent, or Firm*—Antonelli, Terry, Stout and Kraus, LLP.

(57) ABSTRACT

A DC/AC converter is disclosed having two DC voltage connections (1,2), between which are provided in a parallel circuit configuration, an intermediate energy storage ($C_1$) and a bridge circuit providing at least two parallel branches, each branch providing two in-series-connected switch units (A,B and C,D), to each of which a rectifier diode (DA,DB, DC DD) is connected in parallel, and having at least two AC connections, of which each single AC connection is connected via a connecting line, in each of which an inductor ($L_1$ respectively $L_2$) is provided, to one of the parallel branches of the bridge circuit between two the switch units (A,B respectively C,D) via one connecting node. In at least two connecting lines, two separate electrical connecting paths are provided, in each of which a switch (E respectively F) and an in-series-switched rectifier diode (DE respectively DF) are provided. The rectifier diodes (DE,DF) in the single connecting paths are switched in an opposite conducting direction.

41 Claims, 8 Drawing Sheets

(Prior Art)

DC/AC CONVERTER TO CONVERT DIRECT ELECTRIC VOLTAGE INTO ALTERNATING VOLTAGE OR INTO ALTERNATING CURRENT

BACKGROUND OF THE INVENTION

1. Field of the Invention

The present invention relates to a DC/AC converter to convert direct electric voltage (DC) into alternating current or into alternating voltage (AC). Such type converters are used, for example, to supply energy to the public electricity grid or to build an independent island grid where only DC voltage energy sources are available, such as for example photovoltaic systems, fuel cells, batteries, etc.

2. Description of the Prior Art

The purpose of a DC/AC converter for supplying energy to an existent AC voltage grid is to generate an alternating current which is to be adapted with regard to phase position and amplitude of the potential curve of the AC voltage, preferably to a 50 or 60 Hz sine-shaped grid voltage. The purpose of a DC/AC converter for supplying energy to an independent island grid, on the other hand, is to generate an AC voltage that is stable in voltage and frequency. In order to operate any desired capacitive and inductive loads, such DC/AC converters must be able to provide and respectively accept reactive power.

For this purpose, single-phase or three-phase DC/AC converters with or without a transformer are employed in a per se state-of-the-art manner. An overview of the many possible embodiments of such type DC/AC converters is provided in the following sources:

[1] Myrzik, Johanna, Topologische Untersuchungen zur Anwendung von tief/hochsetzenden Stellern für Wechselrichter/Johanna Myrzik.—Kassel:kassel univ.press, 2001,: Kassel, Univ., Diss. 2000, ISBN 3-933146-62-3;

[2] Manfred Meyer, Leistungelectronik, Einführung, Grundlagen, Überblick, Springer-Verlag, Berlin Heidelberg New York London Paris Tokyo Hong Kong Barcelona 1990; and

[3] POWER ELECTRONICS, Converters, Applications and Design, Second Edition, JOHN WILEY & SONS, INC., New York Chichester Brisbane Toronto Singapore, 1989, 1995.

In all applications, of primary importance is a high degree of conversion efficiency, good Electromagnetic Compatibility (EMC) behavior, low volume and low weight as well as low price. Galvanic separation of the DC voltage side and the AC voltage side is generally not required.

A hitherto advantageous circuit in these conditions is a transformerless full-bridge circuit, which is described in detail in [3] and [1]. Presented therein are also various types of timing for the full-bridge circuits, which will be described in more detail below. Advantageous in this topology is high conversion efficiency and low volume and weight. A disadvantage, however, is poor EMC behavior on the input side as well as sometimes lacking four-quadrant operation (reactive power capacity) depending on the type of timing applied.

Furthermore transformerless DC/AC converter topologies, based on a combination of step-down (buck) and step-up (boost) converters (Cuk- and Zeta-converters), are known from Myrzik's abovementioned article. In comparison to the aforementioned bridge circuits, these inverters have the advantage that the value of the input voltage can be lower as well as higher than the maximum value (amplitude) of the sine-shaped grid voltage. In the bridge circuit, on the other hand, the input voltage must always be greater than the grid voltage amplitude in order to be able to feed the grid.

The transformerless topologies described in DE 196 42 522 C2 and DE 197 32 218 C1 are based on a similar approach. Mentioned as an advantage in these circuits based on up/down-stepping converters respectively Cuk- and Zeta-converters is, in particular, the electrical connection of one of the solar generator terminals to a fixed potential (the grid's neutral conductor), which results in advantages in the EMC behavior.

An essential drawback in all the just mentioned topologies, however, is that either the entire or at least a large part of the power transferred to the output has to be intermediately stored in an inductor or transferred to the output via coupling capacitors. In all these circuits, this results in distinctly lower efficiency values in comparison to a simple bridge circuit. Furthermore, these circuits are sometimes very complex and difficult to control.

Moreover, EP 0203 571 B1 describes a generic DC/AC converter for island applications that permits generating an output current that is much higher than the nominal current for a short period of time. This high current is needed to trigger standard safety cutout in case of a short circuit. The method described therein is thus not utilized in normal operation, but rather is actuated by a corresponding evaluation electronics solely if there is a short circuit.

The further embodiments describe the present converter problems in detail, in particular, with regard to single-phase, transformerless converters. However, it should be noted here that the measures described in the following are fundamentally also applicable to DC/AC converters with transformers. Solely for the sake of comprehensiveness, it is also pointed out that apart from single-phase DC/AC converters, there are also multiple-phase operating devices, preferably three-phase converters, which permit, for example, conversion from DC voltage into three periodic current courses respectively voltage courses each phase-shifted by 120°. The embodiments described in the following can also be applied to such type DC/AC converter systems.

Figure 2:
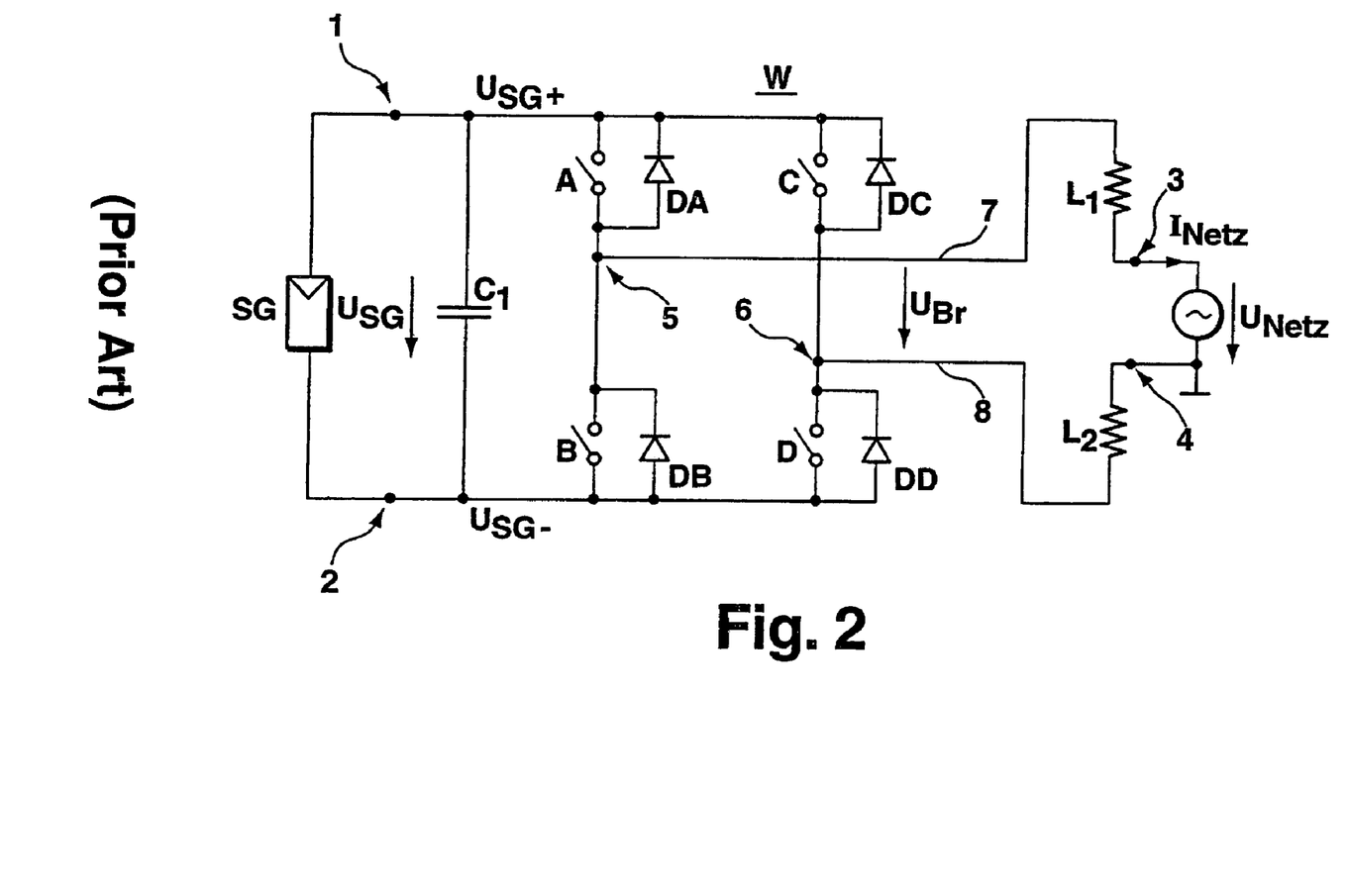
FIG. 2 shows a prior art DC/AC converter topology.

Examined herein is the aforementioned and per se state-of-the-art circuit topology of a single-phase, transformerless DC/AC converter, which according to the prior art embodiment of FIG. 2 provides two DC voltage terminals 1,2 to which, in this example, an external solar generator SG is connected as the DC voltage source, as well as two AC voltage terminals 3,4, which either are connected to a conventional 50 Hz or 60 Hz grid or in the case of island operation to the electric loads. To convert the solar generator DC voltage $U_{SG}$ into an alternating current suited for supplying the grid or into an AC voltage required in island operation, the single-phase, transformerless DC/AC converter W provides a buffer capacitor $C_1$, which is switched in parallel to a full-bridge comprising four switch units A, B, C, D, and switched in anti-parallel to these so called recovery diodes DA, DB, DC and DD.

The individual switch units A, B, C, D are designed as high-frequency switches suited to realize switching operations with frequencies of up to several 100 kHz. Such types of switches are preferably designed as MOS Field Effect Transistors or as IGBT (Insulated Gate Bipolar Transistors).

The parallel branches of the bridge circuit are tapped at the connecting nodes 5, 6 between the switch units A,B and C,D, respectively, by means of the connecting lines 7,8. Both connecting lines 7, 8 are each connected via an inductor $L_1$, respectively $L_2$, to the grid voltage via the AC terminals 3,4. Between the connecting lines 7,8, the bridge voltage $U_{Br}$ is present. Further components required for reliable operation of the DC/AC converter system, such as for example filters for better electromagnetic compatibility (EMC) and parasitic elements, in particular capacitors, are not depicted for reasons of better clarity.

In order to convert the solar energy voltage $U_{SG}$ into an alternating current required for supplying the grid or an AC voltage required for island operation, the switch units A, B, C, D must be opened and closed with a certain high-frequency time pattern, which can have switching frequencies between a few kHz up to several 100 kHz in a tuned manner in order to generate time-discrete differing voltage pulses whose potential position is tuned to the externally applied, respectively in island operation to the to-be-generated, AC voltage $U_{Netz}$. With the aid of the inductors $L_1$, $L_2$ provided in the connecting lines 7, 8, a smooth sine-shaped current curve, respectively voltage curve, can be maintained at the outputs of the AC voltage connections 3, 4.

Fundamentally, it is differentiated between three time patterns with which the switch units A, B, C, D are actuated inside a conventional full-bridge circuit.

In the case of so-called symmetrical time patterns (also called Bipolar Voltage Switching, see Ref. 3), the diagonally opposite switch units, this is A and D or B and C are opened respectively closed in a time-synchronized manner. In order to successfully feed electric energy into the grid, activation of the individual switch units occurs in such a way that during the positive half-wave of the grid voltage the switch units A,D are opened and closed with a high frequency according to a fixed time pattern, for example on the basis of pulse width modulation (PWM), whereas the switch units B and C remain open or are actuated counter-phase to the switches A, D. During the open phase of switches A and D, the current flows through the inductors $L_1$, $L_2$ on the diagonally opposite recovery diodes DB and DC respectively the closed switches B, C. In the reverse case of a negative half-wave prescribed by the grid, the switch units B and C are closed and opened according to the corresponding time pattern, whereas the switch units A and D remain open or are also actuated counter-phase to the switches B,C. Now the inductor current flows through the recovery diodes DA and DD, respectively the closed switches A, D.

Figure 3:
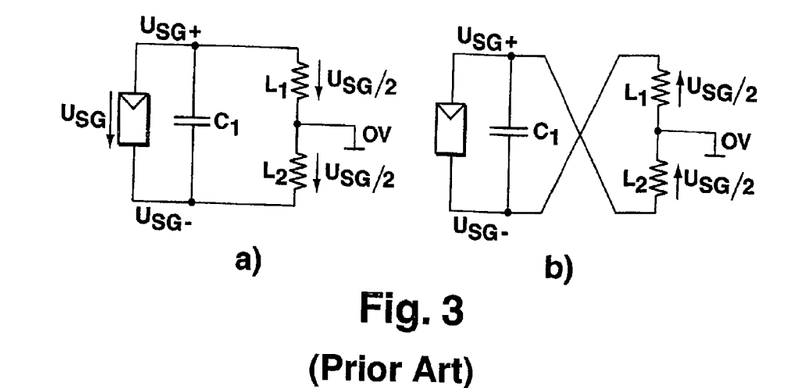
FIG. 3 shows equivalent circuit diagrams for explaining the symmetrical timing in the prior art DC/AC converter according to FIG. 2.

Assuming all this leads to the following electrical properties of the DC/AC converter: the bridge voltage $U_{Br}$ reaches the voltage $+U_{SG}$ when the switch units A and D are closed, respectively the recovery diodes DA and DD are conducting, and reaches the voltage $-U_{SG}$ when the switch units B and C are closed, respectively the recovery diodes DB and DC are conducting. Furthermore, assuming that the inductors $L_1$ and $L_2$ are ideally designed identical, when the timing is symmetrical, in all instances the solar generator voltage $U_{SG}$ divides symmetrically in relation to the reference potential defined by the present value of the grid's AC voltage. To make these conditions more apparent, reference is made to FIGS. 3a and 3b. In FIG. 3a, the switch units A and D are closed, respectively DA and DD are conducting, and an external reference potential of 0 V is assumed. As the solar generator voltage divides symmetrically in relation to the reference potential as described above, the two connecting lines of the solar generator 1, 2 have the potentials $+U_{SG}/2$, respectively $-U_{SG}/2$.

In the case shown in FIG. 3b, switch units B and C are closed, respectively the recovery diodes DB and DC are conducting, which leads to the same potential conditions at the connecting lines of the solar generator. According to FIG. 3a, respectively 3b, the connecting lines of the solar generator constantly have the potentials $+U_{SG}/2$ respectively $-U_{SG}/2$ despite the high-frequency switching of the individual switch units A,B,C,D.

Furthermore, taking into account the external AC voltage, which also divides symmetrically in relation to the two connecting lines due to the inductances $L_1$ and $L_2$, applied to the connecting lines of the DC/AC converter, leads to a voltage at the solar generator terminals fluctuating with a low-frequency of 50 Hz resp. 60 Hz at half the grid amplitude $U_{Netz}/2$. This voltage leads to neither safety problems nor problems with regard to electromagnetic compatibility.

However, two drawbacks are inevitably connected with the symmetrical mode of operating the DC/AC converter. Considering, for example, that those periods during the positive half wave of the grid voltage, in which the switch units A and D are open and considering that the inductor current flowing inside the inductors $L_1$ and $L_2$ is sustained due to the demagnification process inside the inductors, the inductor current flows during the so-called "recovery phase" via the diodes DB and DC, respectively via the closed switches B,C, back to the buffer capacitor $C_1$, which involves considerable losses, which ultimately influences the efficiency of the DC/AC converter negatively.

Furthermore, considerable switch losses occur during the periodic switching of the switches A,D due to the not ideal dynamic properties of the recovery diodes DB and DC, correspondingly also during the negative half wave.

In addition to this, during the commutation of the inductor current through the diodes DB and DC respectively the closed switches B, C into the capacitor $C_1$, the sum of the input voltage (for example, the solar energy voltage $U_{SG}$) and the present grid voltage with reverse polarity is applied to the inductors $L_1$ resp. $L_2$. FIG. 3b shows an equivalent circuit diagram, which also applies to the previously described case of the recovery phase. Due to the high voltage, the inductors $L_1$ and $L_2$ are rapidly demagnified, which leads to high current fluctuations, a so-called current ripple, in the output current, which ultimately leads to marked losses in the inductor and to EMC problems.

In contrast to the aforedescribed symmetrical timing, in so-called unsymmetrical timing (also called Unipolar Voltage Switching, see Ref. 3) the following, always pair wise-closed switch positions of the switch units A,B,C,D occur: A and D or B and C (as in the previously described case) or A and C or B and D are simultaneously closed and alternate directly in a certain sequence without allowing a circuit state in which all four switch units A, B, C, D are permanently open. This timing has the following advantages: in the case of the switch constellations referred to as unsymmetrical, in which A and C or B and D are simultaneously closed, the bridge voltage $U_{Br}$ reduces to 0 V. This circuit state, which is referred to as "zero-voltage period", prevents commutation of the inductor current via respective recovery diodes to the buffer capacitor $C_1$, thereby improving the efficiency of the DC/AC converter decisively in comparison to symmetrical timing. Furthermore, in unsymmetrical timing, the sum of the present grid voltage and the solar generator voltage $U_{SG}$ is not fed to the inductors $L_1$ and $L_2$, but rather only the present grid voltage $U_{Netz}$, which contributes to reducing the inductor current. Due to the much lower voltage, the current fluctuations (current ripples) occurring in the inductor and in the output current are considerably smaller, thereby increasing efficiency and improving electromagnetic compatibility.

Figure 4:
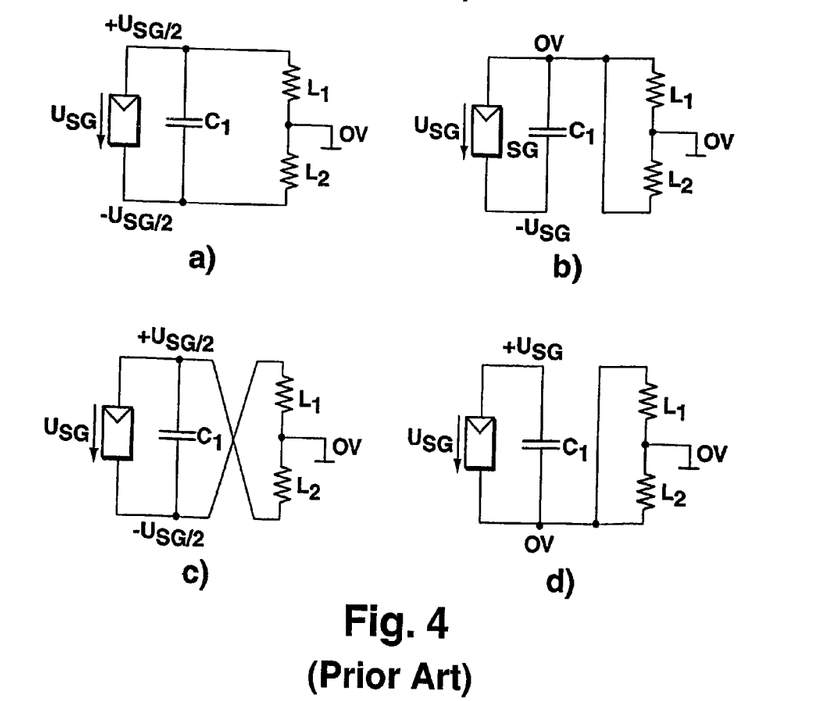
FIG. 4 shows equivalent circuit diagrams for explaining the unsymmetrical timing in the prior art converter according to FIG. 2.

However, one drawback, which is shown in FIGS. 4a to 4d, is inevitably connected with unsymmetrical timing. Only for the sake of easier understanding, let us assume that the momentary AC voltage in the equivalent circuit diagrams in FIGS. 4a to 4d equals 0 V. The equivalent circuit diagrams according to FIGS. 4a and 4c correspond to the circuit states with closed circuit units A and D as well as B and C, thus corresponding to symmetrical timing. In both cases, constant potentials are fed to the connecting lines of the solar generator SG, notably $+U_{SG}/2$ respectively $-U_{SG}/2$. The circuit states in FIGS. 4b and 4d shows closed circuits A and C respectively B and D. In this case, however, the connecting lines of the solar generator SG no longer have the constant potentials $+U_{SG}/2$ respectively $-U_{SG}/2$, but rather leap to the values 0 V respectively $-U_{SG}$ in the case shown in FIG. 4b and to $+U_{SG}/2$ respectively 0 V in the case shown in FIG. 4d.

If the grid voltage $U_{Netz}$ differs from 0 V, this voltage also divides symmetrically in all the time phases on the two inductors L1 and L2, so that, for example the following potentials occur periodically on the positive solar generator connecting line: $(U_{SG}/2+U_{Netz}/2)$, $(U_{Netz}/2)$ and $(U_{SG}+U_{Netz}/2)$.

In view of the fact that typical solar generator voltages lie in the range between 400 V and 750 V, when taking into account the potential value due to the grid voltage, potential fluctuations between 0 V and approximately 1 kV can occur at the connecting lines of the solar generator. However, these potential fluctuations occur as high-frequency voltage leaps with frequencies of up to more than 100 kHz and lead to extremely large leakage currents via parasitic capacities, as usually occur in large-area solar generators, which decisively diminish the electromagnetic compatibility of such systems. Moreover, the high-frequency leaps in voltage represent a considerable potential hazard when coming into contact with the insulated module surfaces due to capacitive coupling.

A third type of timing described in Myrzik's abovementioned dissertation [1] is so-called single-phase chopping. In this case, a bridge branch, for example the switches C, D, is only switched periodically with grid frequency (50 Hz or 60 Hz), whereas the other bridge branch is timed sine-modulated (PWM) with a high frequency. Thus, for example, during the positive half wave, switch D is permanently closed and switches A, B are timed. In this manner, in a time period in which both the switches B and D are simultaneously closed, a bridge voltage of 0 V (zero-voltage period) is yielded so that very good efficiency is achieved with this type of timing as with the aforedescribed unsymmetrical timing.

Just as above, single-phase chopping has the great disadvantage that alternating either the positive or the negative terminal of the solar generator is connected to the grid's neutral conductor via switches C, D. Thus the potential of the solar generator leaps periodically by the level of the solar generator voltage against the ground potential, which, as already described, leads to considerable EMC and safety problems.

SUMMARY OF THE INVENTION

Based on the previously described state of the art, the present invention provides a DC/AC converter which combines the advantages of the aforedescribed symmetrical and unsymmetrical timing including the advantages of single-phase chopping while at the same time avoiding the drawbacks associated with the aforementioned prior art. In particular, a DC/AC converter in accordance with the invention has better efficiency and better electromagnetic compatibility than hitherto prior-art DC/AC converters while at the same time avoiding the use of complicated and expensive circuit topologies. Moreover, the object is to make possible using the DC/AC converter selectively in grid feeding operation as well as in island operation.

A key element of the present invention is that a DC/AC converter having two DC voltage connections, between which are provided in a parallel circuit configuration, an intermediate energy storage and a bridge circuit, which has at least two parallel branches each provided with two switch units connected in series to each of which a rectifier diode is connected in parallel, and having at least two AC voltage connections, of which each is connected via connecting lines, in each of which an inductor is provided, to one of the parallel branches of the bridge circuit respectively between two switch units via a connecting node, is improved in that between the at least two connecting lines, two electric connecting paths are provided, in each of which a switch and a rectifier diode connected in series are provided, and in that the rectifier diodes in the individual connecting paths are switched to each other in opposite conducting direction.

As further embodiments will show, the switches E and F are operated in a clocked manner during operation of the DC/AC converter.

It is to be noted that the invention also extends to circuit topologies, which can be obtained by using alternative electronic component configurations and corresponding substitution of the combination of switch and rectifier diode in the connecting lines and have the same or similar electric respectively electronic effects in circuit behavior. Thus, in particular, a combination of switch and rectifier diode is possible in designing only a single electronic component, whose use definitely also falls under the general inventive idea.

However, in order to simplify the description of the invention, first reference is made to a DC/AC converter, which provides two parallel connecting paths between the two connecting lines.

With the invention providing the additional connecting paths between the connecting lines to tap the bridge voltage opens the possibility of alternative recovery paths along which the inductor current can circulate due to the demagnification processes of the inductors.

The efficiency of the DC/AC converter is considerably improved by this means, because no energy losses connected with energy backflow into the buffer capacitor can occur. At the same time, in a recovery case, unlike in the prior art (symmetrical timing), the sum of the solar generator voltage and the present grid voltage is not fed to the inductor but solely the momentary grid voltage, which permits considerably reducing the disadvantageous current ripples in the inductors and in the output current described in the prior art.

Finally, the additional recovery paths provided according to the present invention permit complete ohmic decoupling between the DC voltage connections and the connected DC voltage source, preferably a solar generator, and the AC voltage connections during the recovery phase. This has the advantageous consequence that high-frequency voltage leaps at the connection lines of the solar generator as occur in the prior art (unsymmetrical timing respectively single-phase chopping) can be fundamentally avoided. In this manner, the hazard potential mentioned in the introduction and the discussed problem regarding electromagnetic compatibility in operating such a type DC/AC converter are reduced to such an extent that it may be considered safe.

Further advantages of the DC/AC converter designed according to the invention, which are also related to possible cost-effect realization of the required circuit topology, are explained in more detail with reference to concrete preferred embodiments.

BRIEF DESCRIPTION OF THE DRAWINGS

The present invention is made more apparent, by way of example without the intention of limiting the spirit or scope of the inventive idea, using preferred embodiments with reference to the accompanying drawings. Shown are in.

DESCRIPTION OF THE EMBODIMENTS OF THE INVENTION

Figure 1:
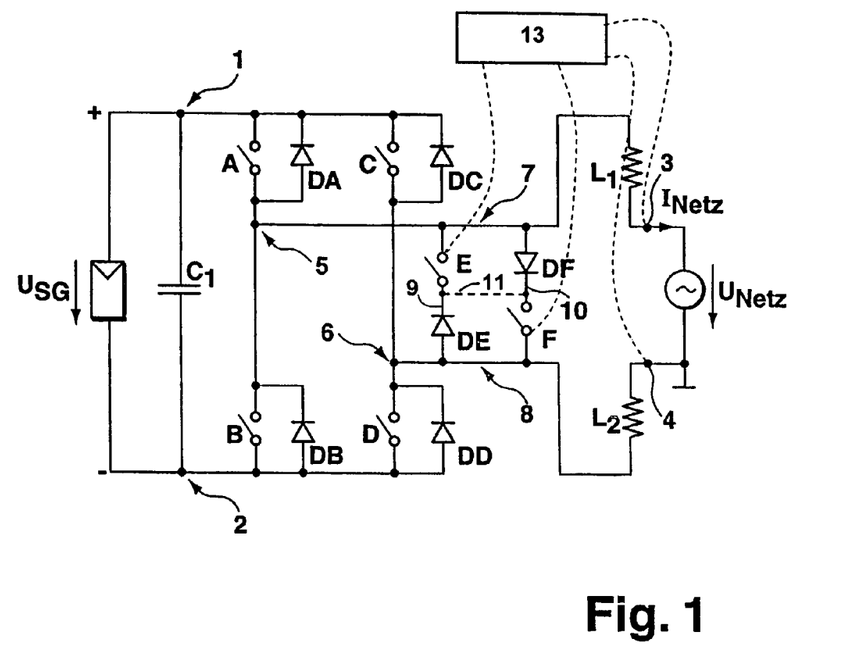
FIG. 1 shows a schematic circuit design of a DC/AC converter of the invented design.

As in the DC/AC converter circuit set up described as the closest prior art with reference to FIG. 2, the DC/AC converter according to FIG. 1 is also provided with a parallel circuit comprising an energy intermediate storage $C_1$, preferably in the form of a buffer capacitor, and a bridge circuit. The parallel circuit is connected between the DC voltage connection 1,2. As in the bridge circuit shown in FIG. 2, the bridge circuit is provided with four switch units A, B, C, D to which the rectifier diodes DA, DB, DC, DD are connected in parallel respectively. The difference relative to the prior-art topology according to FIG. 2 is the provision of two additional electric connecting paths 9, 10 between the connecting lines 7, 8 to tap the bridge voltage $U_{Br}$ at the connecting nodes 5,6. Located in each individual connecting paths 9, 10 is a switch E, F and a rectifier diode DE, DF respectively, which are switched relative to each other in an opposite conducting direction. All the other circuit components correspond to the prior art circuit configuration shown in FIG. 2, thus obviating any further reference. In addition, a control unit 13 is provided for switching the switches E,F in dependence on an AC voltage fed to the AC voltage connections 3,4. In FIG. 1 the control unit 13 is connected by dashed lines with the switches E, F and the connections 3, 4. In other embodiments the control unit 13 can also be connected with other elements shown in the disclosed converter circuit. This control unit 13 can be realized in conventional analog or digital technology, but will preferably be realized by means of a Digital Signal Processor (DSP). The control unit 13 can be an additional unit within an inverter, but typically it will be an add-on of the conventional control unit.

Of course, the component combination of switch E and diode DE and respectively switch F and diode DF in the individual connecting paths 9, 10 can also be replaced by components which have the same effect and which possess, in the individual connecting paths 9, 10, the same current conducting properties as the switches E or F in combination with the diodes DE or DF respectively. Optionally, the hatched diagonal connection 11 can be added between the connecting paths, which does not basically change switch behavior, but in practice permits advantageous combination of the switch E and the diode DE, respectively switch F and diode DF, in a single component, for example a MOS-FET with a parasitic diode or in the form of an IGBT/diode co-pack.

The manner of operation of a DC/AC converter according to FIG. 1 occurs according to the described symmetrical timing of the switch units A, B, C, D provided in the bridge circuit as described in the introduction, that is the switch units A and D, respectively B and C, are opened and closed according to a predetermined time pattern in dependence on the polarity of the half waves of the grid voltage $U_{Netz}$. The time behavior with which the single switch units A–D are switched is shown in FIGS. 7 to 10.

Figure 7:
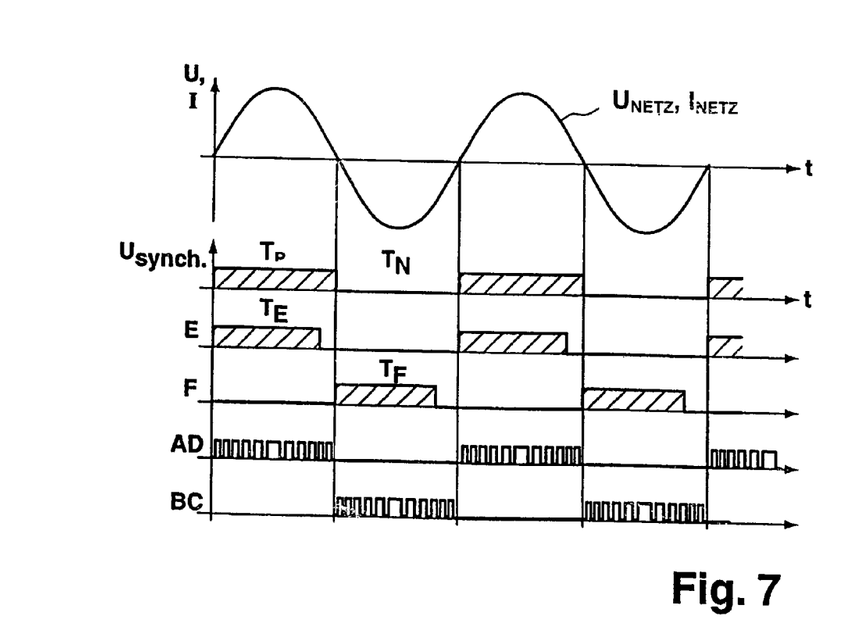
FIG. 7 shows a representation of the timing behavior of individual switch units.

FIG. 7 shows the timing in "grid-feeding" type of operation, in which no reactive power is required, thus there is at no time a backflow of energy from the grid into the buffer capacitor $C_1$, respectively into the DC voltage source $U_{SG}$.

Figure 10:
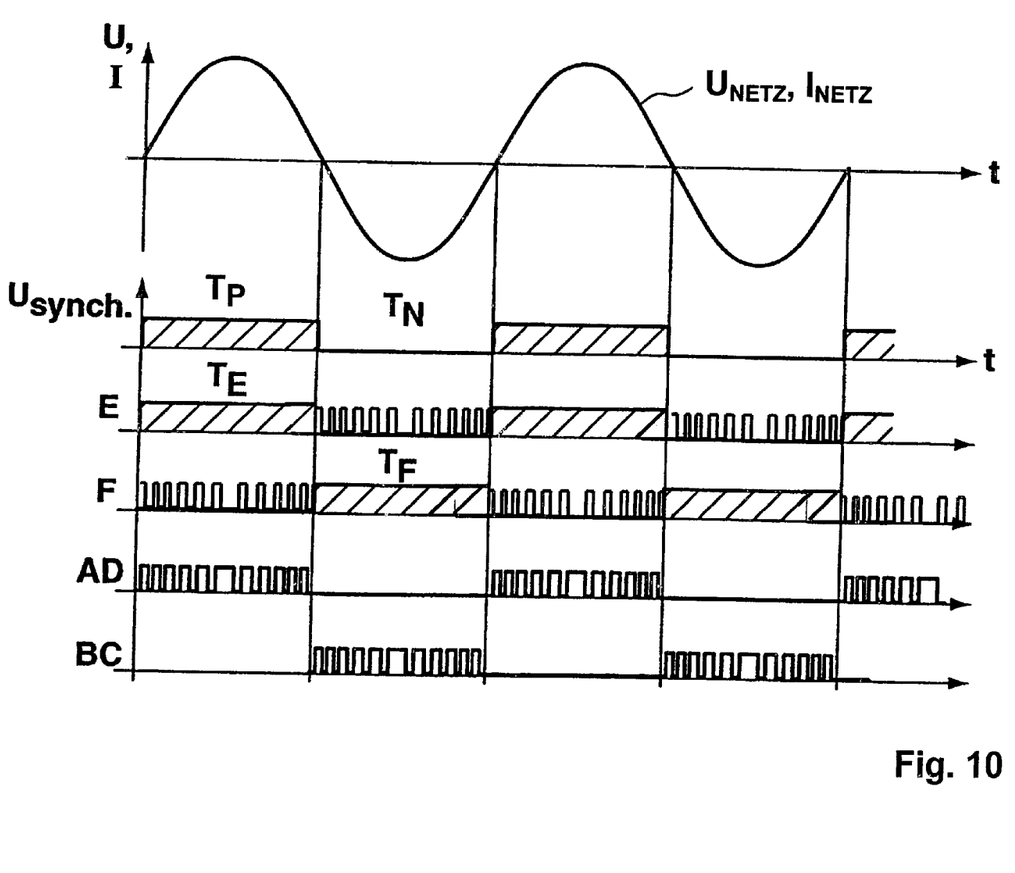
FIG. 10 shows a representation of the timing behavior of individual switch units in island operation.

On the other hand, the time scheme shown in FIG. 10 permits full so-called four quadrant operation, that is the DC/AC converter acts as a voltage source for supplying energy to a load, and the DC/AC converter is not connected on the output side to a fixed predetermined grid AC voltage potential. This case corresponds to island operation as described in the introduction. The selection of the two types of timing can occur depending on the application.

In the time diagrams shown in FIG. 7, the top diagram corresponds to the temporal course of the externally applied grid voltage $U_{Netz}$. With the aid of a suitable comparator circuit, which is not be explained in more detail, a rectangular-shaped synchronization voltage $U_{synch}$, can be obtained, which provides a constant positive voltage value $T_p$ during the periods of the positive half wave of the grid voltage and, for example, 0 V, during the periods of the negative half wave. The switch units A, D, respectively B, C, in FIG. 7 are actuated in dependence on the synchronization voltage $U_{synch}$, and thus in dependence on the grid voltage.

For example, in the case of a positive half wave, the switch units A, D are closed and opened in a synchronized manner at the beginning of the positive half wave in short successive pulses. In the range of the temporal middle of the positive half wave, the time periods in the closed state extend until they are only briefly closed toward the end of the positive half wave in the same manner as at the beginning. The switch units B, C are modulated with the same time pattern when the half wave of the AC voltage is negative. The mode of such a type switch actuation is a state-of-the-art method known as pulse width modulation (PWM). As already mentioned in the introduction, switching frequencies of up to several 100 kHz are applied to the switch units A, B, C, D.

In contrast to the high-frequency timing mode with which switch units A, B, C, D are actuated, switches E, F in the additional connecting paths 9,10 are operated in a time-synchronized manner with the frequency of the grid voltage $U_{Netz}$, i.e. usually with 50 Hz or 60 Hz. Thus, in the illustrated example according to FIG. 7, switch E is closed during the predominant positive half wave period, whereas the switch F is open. Correspondingly inversely, the switch F closes during the predominant negative half wave period when the switch E is open.

Viewing now the brief moments in which, for example, the switch E is closed, thus during the positive half wave of the grid voltage, and when the switch positions of switches A, D are open, the positive inductor current flows through the diode DE and thus does not flow back to the buffer capacitor $C_1$. Likewise, in the case of a negative half wave, the switch F is closed and when the switch positions of switches B, C are open, the negative inductor current flows through the rectifier diode DF (see FIG. 1).

Figure 5:
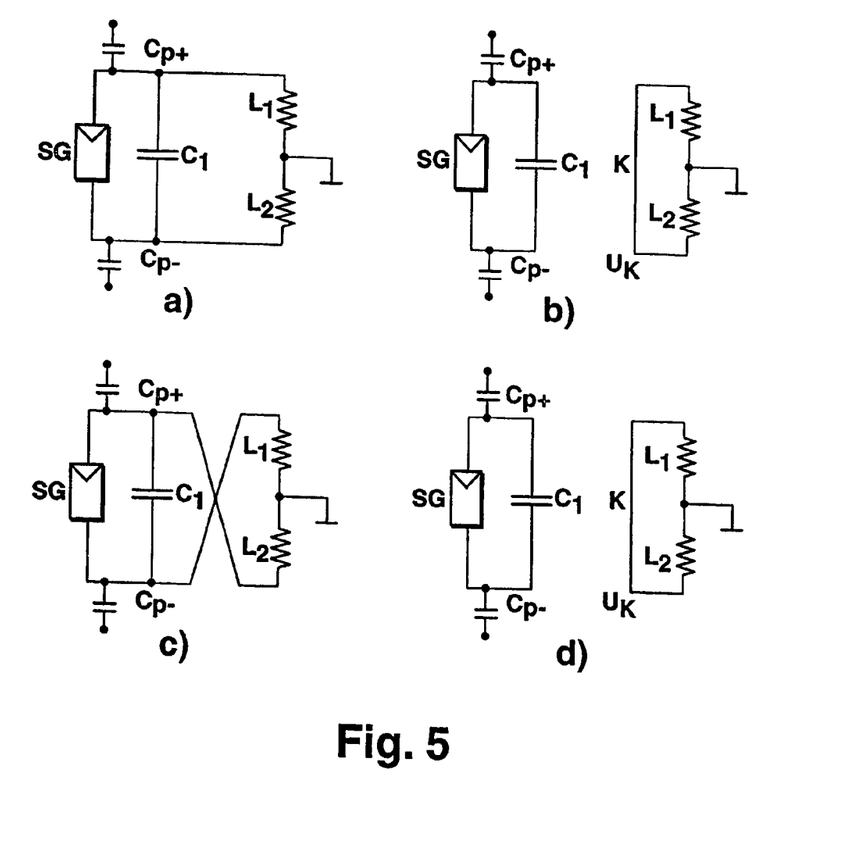
FIG. 5 shows equivalent circuit diagrams for explaining the potential behavior in the DC/AC converter of the invented design.
Figure 6:
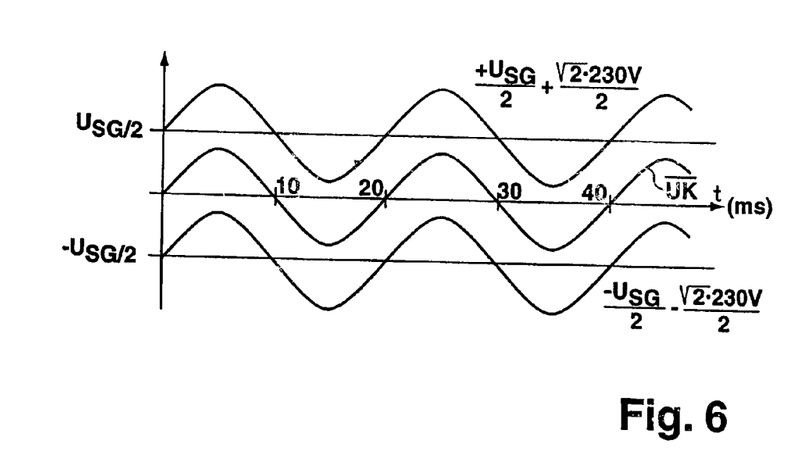
FIG. 6 shows a voltage course at the connecting lines of a solar energy generator.

Thus, if the DC/AC converter is operated with symmetrical timing, the following potential relationships depicted in FIGS. 5 and 6 are yielded during operation. FIGS. 5a and c show the equivalent circuits diagrams for the DC/AC converter topology when switch units A, D (see FIG. 5a) and B, C (see FIG. 5c) are closed. It shows that there is no fundamental difference to the prior-art case (see FIGS., 4a, c). During the recovery phases, i.e. when switch units A, D are open, the state shown in FIG. 5b sets in, whereas FIG. 5d shows the equivalent circuit diagram for the open switch position with regard to switch units B, C. It shows that during the so-called recovery phases, that is the switch units A, B, C, D are open, according to the equivalent circuit diagrams in FIGS. 5b and d, half the grid voltage $U_{Netz}/2$ is fed to the connecting node K due to the symmetrical inductor configuration $L_1$, $L_2$. The voltage at the connecting node K is, therefore, always within the two potentials predominating at the connecting lines of the solar generator. Thus, provided that the components are ideal, during the recovery phases, there is no ohmic connection between the solar generator and the grid. However, this leads to the favorable advantage that jumps in high-frequency voltage, as occur in the prior art DC/AC converters with unsymmetrical timing or single-phase chopping described in the introduction, are completely avoided. Moreover, the potential of the connecting lines of the solar generator remains a constant potential during the recovery phases due to the existent parasitic capacities $C_{p+}$ respectively $C_{p-}$. This property results in higher electromagnetic compatibility without any potential hazard at all.

Even if the utilized inductors $L_1$ and $L_2$ do not possess identical inductances—a requirement which must be met with great care in prior-art circuit and symmetrical timing if high-frequency potential jumps are to be prevented—with the circuit of the invention the potentials of the solar generator's connection lines shift only negligibly in relation to each other during the two half waves and are no longer exactly $+/-U_{SG}/2$. Consequently, when changing from one half wave to the other, that is with 50 Hz or 60 Hz, there is a small jump in potential which is easy to control. Thus the inductors can very well show tolerances although EMC is improved considerably.

FIG. 6 depicts a representation of a diagram showing the voltage courses fed to the solar generator lines. The positive and negative connecting potential behaves symmetrically and in a time-synchronized manner at the solar energy connecting lines, whereas when a grid AC voltage of 230 V is applied, a maximum amplitude of $U_{SG}/2+\sqrt{2}\times 230/2$ V occurs at a frequency of 50 Hz resp. 60 Hz.

A further interesting aspect relates to the design of the recovery diodes DA, DB, DC DD, for whose diode quality the DC/AC converter according to the invention makes no special demands as the diodes do not take on any commutation functions worth mentioning in the recovery phases, because commutation of the inductor current during the recovery phases occurs in dependence on the polarity of the half wave of the grid voltage via the recovery diodes DE, respectively DF. Although their significance and therefore the quality demands on the rectifier diodes is reduced, they cannot be completely obviated. The reason is the necessity of complete as possible demagnification of the inductors $L_1$, $L_2$ toward the end of each grid half wave, which cannot be ensured with the switch E, respectively F, closed due to the low grid voltage at disposal for reducing the current. For this reason, the switches E, respectively F, are not closed for the entire duration of the respective half wave, but rather open already shortly before the end of each half wave, as moreover the comparison of the time behavior of the individual switches in relation to the half wave according to FIG. 7 shows. The early opening of the respective switch E or F (See the shortened switch times $T_E$ respectively $T_F$ in relation to the temporal length of the respective half waves in FIG. 7) is required in order to enable the inductor current present in the inductors $L_1$, $L_2$, due to the sum of the current grid voltage and input voltage fed to the inductors following opening of switches E, respectively F, to subside quickly. The rectifier diodes DA, DB, DC and DD serve this purpose as in the prior art described in the preceding. Thus, for example, during the positive half wave the inductor current flows through the diodes DB and DC into the capacitor C, when the switches A–F are open. As opening the switches E, respectively F, occurs in the time periods in which the inductor currents have for the most part subsided, no current-ripple effects of significance occur which might impair the advantage of the invented circuit topology.

The temporal actuation of the circuit units E and F occurs via the control unit 13 which is realizable in the simplest embodiment by means of discrete-time function elements. A drawback in using time function elements with a constant switch-on period $T_E$, respectively $T_F$, is the fact that it cannot be ruled out that the switches E, F are opened too early or too late in relation to the AC voltage course, causing efficiency losses as well as EMC problems as are familiar from the prior art.

A preferred embodiment of the temporal actuation of the switches E, F is based on the utilization of the error signal of the current regulator and the phase information at the grid voltage. Such a type current regulator present in a prior-art manner in the DC/AC converter control always forms the difference between a desired sine-shaped current value and the actual current value. The difference between the desired current value and the actual current value, referred to as error signal FS, is positive in the positive half wave as long as the output current is smaller than the desired value and negative when the output current lies above the desired value. This error signal FS has an approximately sine-shaped curve and controls the switch-on times of the switch units A to D via a pulse-width modulator (PWM).

Figure 8:
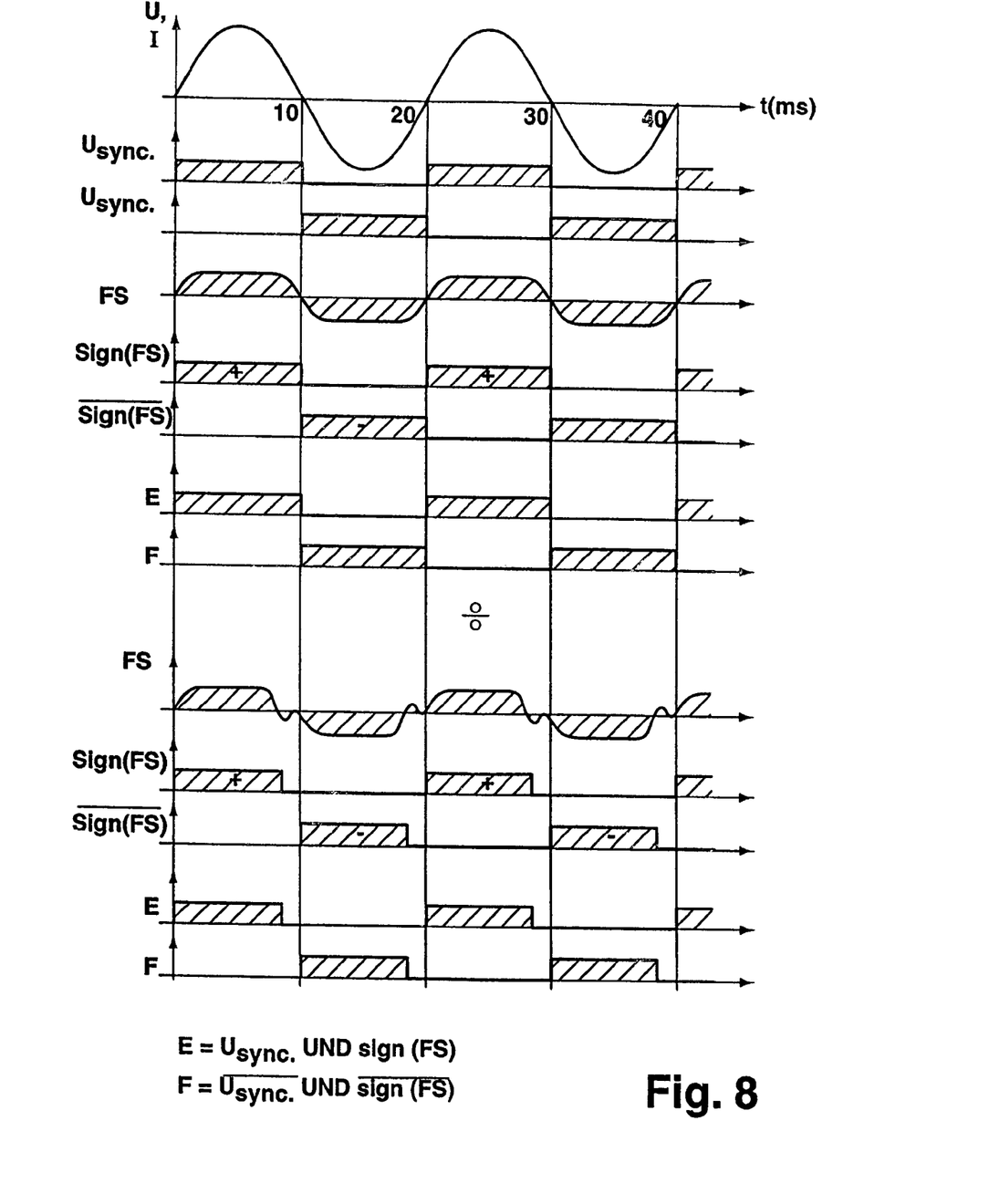
FIG. 8 shows a representation of the timing behavior of individual switch units.

In the above-described case of a too slow subsiding of the inductor current, the current regulator reacts with a negative error signal during the positive half wave and correspondingly inversely during the negative half wave (See in FIG. 8 the small negative half wave in the error signal FS towards the end of a positive half wave, respectively the formation of a small positive half wave towards the end of the negative half wave). This behavior in the error signal FS serves to actuate the switches E, respectively F, in an advantageous manner, in that the preceding sign of the error signal SIGN(FS) is logically connected with the synchronization signal $U_{synch}$ via an AND gate. Thus, the switch E is only closed when the positive half wave and a positive error signal are present. For actuating the switch F, the negative signals of $U_{synch}$ and SIGN(FS) are logically linked via an AND gate.

With the aid of such type self-regulating timing of switches E and F, their opening times can be automatically optimally determined. In this manner, the highest efficiency with the lowest current distortions and lowest EMC problems in operating the invented DC/AC converter can be achieved.

An alternative, technically quite realizable embodiment form of a DC/AC converter according to the invented design is also feasible in that, instead of the connecting paths 9, 10 with the switches E, F and rectifier diodes DE, DF contained therein described in the preceding, a single connecting path with a single, high-frequency switch is utilized. The single, high-frequency switch should be closed exactly at those times at which the switch units A to D are open, as described in the preceding with symmetrical timing operation. Similarly, the switch should be left in a correspondingly opened position toward the end of the half waves in order to let the demagnification of the inductors $L_1$ and $L_2$ subside, as described in the preceding.

The configuration depicted in FIG. 1 is fundamentally also suited for use as an island DC/AC converter. In this case, the supplying energy source can either be a solar generator (for example, for emergency supply if there is sufficient momentary solar generator power) or usually a storage battery or a fuelcell. In the case of island operation, the DC/AC converter itself has to provide a sine-shaped output voltage that is stable in voltage and frequency. For this purpose, the DC/AC converter generates internally a desired sine-shaped voltage value from, e.g., a table or by means of real-time computation. Furthermore, it must also permit energy backflow (four-quadrant operation) from the loads in the direction of the buffer capacitor or the supplying source (for example, a battery). This is absolutely necessary in the case of island operation with reactive loads and corresponding phase shifts between the current and the voltage.

Figure 9:
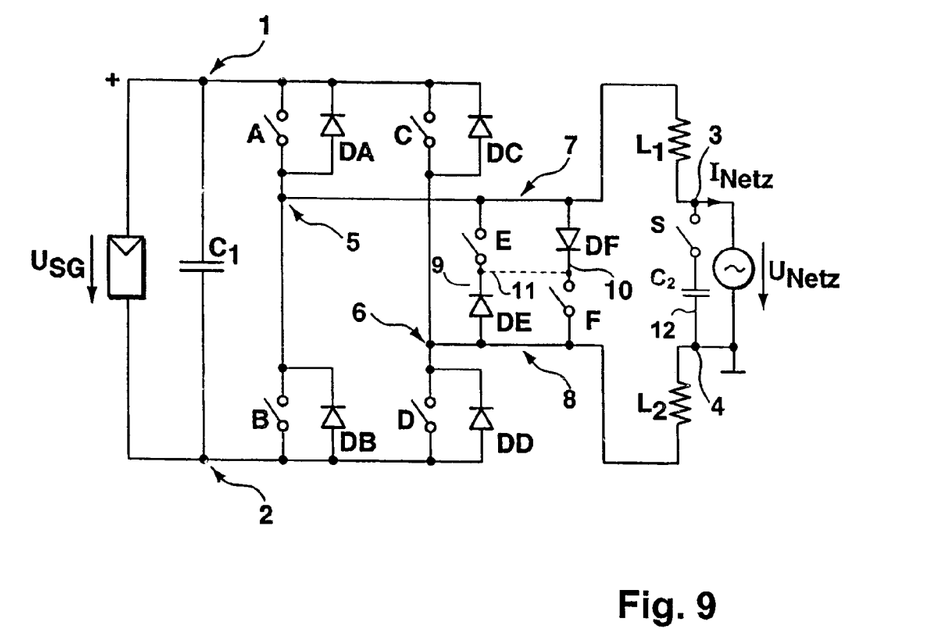
FIG. 9 shows a schematic circuit set up of a DC/AC converter of the invented design in island operation.

Therefore, for island operation, the circuit of FIG. 1 is extended according to FIG. 9 by one output capacitor $C_2$, which is switched via switch S in island operation in parallel to the output clamps of the DC/AC converter. This output capacitor $C_2$ acts in a prior-art manner as an energy buffer in the output cycle and serves, for example, to maintain the desired sine-shaped voltage in erratic load changes (for example, a load with phase controlled modulator).

Furthermore, it is necessary to change the timing of the switches according to FIG. 10 in comparison to grid-coupled operation. In "grid feeding" operation, the DC/AC converter always works as a step-down (buck) converter and generates a sine-modulated low output voltage from the high solar generator input voltage, whereas in island operation, reversal of the energy flow direction is temporarily required, in which the DC/AC converter works as a step-up (boost) converter and raises the energy from the low output voltage level to the higher voltage level of the input capacitor $C_1$, respectively of the supplying battery. The behavior of the DC/AC converter required as step-up converter can be achieved by actuating the switches according to FIG. 10. In contrast to FIG. 7, in corresponding sections of the desired voltage value, here the switches E, respectively F, are timed counter to the bridge switches A, D, respectively B, C. Thus, for example, during the positive half wave, switch E, as described, is permanently switched on, the switch F, however, is actuated counter-phased to the switch pair A, D. As a result, with a positive output voltage $U_{Netz}$, a negative inductor current $I_{Netz}$ that flows into the DC/AC converter can build up via the closed switch F and the diode DF. When the switch F is opened in the next time section, the inductor current first flows through the diodes DA and DD permitting in this manner an energy flow into the buffer capacitor $C_1$, respectively in the case of feeding the DC/AC converter from a battery into this battery. If, following a short delay, which is required to prevent overlapping of the closing times of the switches, the switches A and D are closed, the current can alternately flow back into the source via these two elements. The recovery path 9 with the switch E and the diode DE has no function during this energy back-feeding procedure, but it immediately takes over its function again as a recovery path for positive output currents $I_{Netz}$ if the energy flow direction reverses as described.

Switching between the two types of operation can occur without difficulty while the operation is running so that four-quadrant operation is also feasible in grid parallel operation if the DC/AC converter, e.g. is to be utilized to compensate reactive power or as an active harmonics filter. Furthermore, switching between the prior art operated types of timing and the novel method is also possible in order, for example, to obtain a smooth transition from one half wave to the other in the vicinity of a zero crossing.

LIST OF REFERENCE SYMBOLS

1,2 DC voltage connections
3,4 AC voltage connections
5,6 connecting nodes
7,8 connecting lines
9,10 connecting paths
11 electrical connection
12 connecting path
13 control unit
SG solar generator
$C_1$ buffer capacitor (input)
$C_2$ buffer capacitor (output)
A,B,C,D, switch units
E,F,S switches
DA, DB, DC, DD, DE, DF rectifier diodes
$L_1$, $L_2$ inductors
W DC/AC converter
SG solar generator
K nodal point

What is claimed is:

1. A DC/AC converter comprising:
   two DC voltage connections, between which are provided in a parallel circuit configuration, an intermediate energy storage and a bridge circuit providing at least two parallel branches, each parallel branch providing two in-series-connected switch units, to each of which a rectifier diode is connected in parallel, and including at least two AC connections, of which each single AC connection is connected via a connecting line, in each of which an inductor is provided, to one of the parallel branches of the bridge circuit between two of the switch units via one connecting node; and wherein
   between at least two of the connecting lines, two separate electrical connecting paths are provided, in each of which a switch and an in-series-switched rectifier diode are provided, and the rectifier diodes in each connecting path are switched to each other in an opposite conducting direction.

2. The DC/AC converter according to claim 1, wherein:
   a control unit switches the switches in dependence on an AC voltage fed to the AC voltage connections in such a manner that the switch, whose respective rectifier diode is oriented in the conducting direction for a current direction predetermined by the AC voltage source along a respective connecting path, is closed at least at sometime inside the respective connecting path during a half wave of the AC voltage, while the other switch is open.

3. The DC/AC converter according to claim 2, wherein: the individual switches are switchable in the connecting paths in a time-synchronized manner with positive and negative half waves of the AC voltage fed to the AC voltage connections.

4. The A DC/AC converter according to claim 2, wherein: the AC voltage is a frequency grid voltage having a frequency of 50 Hz or 60 Hz.

5. The DC/AC converter according to claim 2, wherein: the control unit opens the closed switch in the two separate conducting paths before a half wave of the AC voltage has a voltage zero crossing so that both the switches in the two separate conducting paths are open until a start of a next half wave.

6. The DC/AC converter according to claim 3, wherein: the control unit opens the closed switch in the two separate conducting paths even before a half wave of the AC voltage has a voltage zero crossing so that both the switches in the two separate conducting paths are open until a start of a next half wave.

7. The DC/AC converter according to claim 2, wherein: the control unit is provided with constant time function elements which are tuned in dependence on the AC voltage and actuate the switches in the two separate conducting paths with a constant switch-on period.

8. The DC/AC converter according to claim 2, wherein: the control unit switches the switches in dependence on a current flowing in the connecting paths and on the AC voltage.

9. The DC/AC converter according to claim 1, wherein: between the two separate electrical connecting paths, an electrical connection is provided.

10. The DC/AC converter according to claim 9, wherein: the electrical connection is connected to one of the connecting paths centered between the switches in the two separate conducting paths and the in-series-connected rectifier diode.

11. A DC/AC converter comprising:
two DC voltage connections, between which are provided in a parallel circuit configuration, an intermediate energy storage and a bridge circuit providing at least two parallel branches, each parallel branch providing two in-series-connected switch units, to each of which a rectifier diode is connected in parallel, and including at least two AC connections, of which each single AC connection is connected via a connecting line, in each of which an inductor is provided, to one of the parallel branches of the bridge circuit between two of the switch units via one connecting node and wherein;
between the at least two connecting lines, a circuit configuration is provided which can be actuated so that the circuit configuration electrically connects the at least two connecting lines with each other in a first state and insulates the two connecting lines from each other in a second state.

12. The DC/AC converter according to claim 11, wherein: a control unit switches the circuit configuration in dependence on an AC voltage fed to the AC voltage connections so that the circuit configuration assumes a first state at a start and during a half wave of the AC voltage when the switch units are open and assumes a second state when at least one of the switch units is closed; and at an end of a respective half wave, the circuit configuration remains open until a start of a next half wave.

13. The DC/AC converter according to claim 11, wherein: said circuit arrangement provides a switch.

14. The DC/AC converter according to claim 2, wherein: the switch units are crossed in relation to each other inside a bridge circuit, and the rectifier diodes of the switch units are oriented in a fixed direction to a current direction impressed on the parallel branches by an AC voltage applied to the AC connections in the parallel branches; and the control unit opens and closes the switch units in a synchronized manner according to a predeterminable time pattern in dependence on the AC voltage applied to the AC voltage connections.

15. The DC/AC converter according to claim 11, wherein: the switch units are crossed in relation to each other inside a bridge circuit, and the rectifier diodes of the switch units are oriented in a fixed direction to a current direction impressed on the parallel branches by an AC voltage applied to the AC connections in the parallel branches; and the control unit opens and closes the switch units in a synchronized manner according to a predeterminable time pattern in dependence on the AC voltage applied to the AC voltage connections.

16. The DC/AC converter according to claim 14, wherein: the control unit opens said switch units according to a time pattern during one half wave of the AC voltage and closes the switch units according to a time pattern while other switch units are open; and the control unit opens the other switch units according to a time pattern with a next half wave and closes the other switch units according to a time pattern while the switch units are open.

17. The DC/AC converter according to claim 15, wherein: the control unit opens said switch units according to a time pattern during one half wave of the AC voltage and closes the switch units according to a time pattern while other switch units are open; and the control unit opens the other switch units according to a time pattern with a next half wave and closes the other switch units according to a time pattern while the switch units are open.

18. The DC/AC converter according to claim 16, wherein: the switch units are switchable with switch frequencies in a kHz range.

19. The DC/AC converter according to claim 17, wherein: the switch units are switchable with switch frequencies in a kHz range.

20. The DC/AC converter according to claim 14, wherein: the time patterns correspond to a pulse width modulation.

21. The DC/AC converter according to claim 15, wherein: the time patterns correspond to a pulse width modulation.

22. The DC/AC converter according to claim 1, wherein: the intermediate energy storage is a capacitor.

23. The DC/AC converter according to claim 11, wherein: the intermediate energy storage is a capacitor.

24. The DC/AC converter according to claim 1, wherein: the electrical connecting paths are provided between the inductors and the connecting nodes between the at least two connecting lines.

25. The DC/AC converter according to claim 11, wherein:
the electrical connecting paths are provided between the inductors and the connecting nodes between the at least two connecting lines.

26. The DC/AC converter according to claim 1, wherein:
between the connecting paths and the AC connections, an additional connecting path is provided between the connecting lines including a switch and an additional buffer capacitor connected in series.

27. The DC/AC converter according to claim 11, wherein:
between the connecting paths and the AC voltage connections, an additional connecting path is provided between the connecting lines including a switch and an additional buffer capacitor connected in series.

28. A DC/AC converter comprising:
two DC voltage connections, between which are provided in a parallel circuit configuration, an intermediate energy storage and a bridge circuit providing at least two parallel branches, each branch providing two in-series-connected switch units, to each of which a rectifier diode is connected in parallel, and including at least two AC connections, of which each single AC connection is connected via a connecting line, in each of which an inductor is provided, to one of the parallel branches of the bridge circuit between two of the switch units via one connecting node; and wherein
between the at least two connecting lines, electrical connecting paths are provided, in each of which a component configuration is provided, each of which functions in a same manner as one switch and a rectifier diode connected in series, with the rectifier diodes being disposed in the individual connecting paths relative to each other in an opposite conducting direction.

29. A use of the DC/AC converter according to claim 1, as a grid DC/AC converter.

30. A use of the DC/AC converter according to claim 11, as a grid DC/AC converter.

31. A use of the DC/AC converter according to claim 28, as a grid DC/AC converter.

32. A use according to claim 29, wherein:
one of a photovoltaic unit or a fuel cell unit is applied to the AC voltage connections to generate AC voltage, and a grid voltage with 50 Hz or 60 Hz is applied to the AC connections.

33. A use according to claim 32, wherein:
one of a photovoltaic unit or a fuel cell unit is applied to the AC voltage connections to generate AC voltage, and a grid voltage with 50 Hz or 60 Hz is applied to the AC connections.

34. A use according to claim 31, wherein:
one of a photovoltaic unit or a fuel cell unit is applied to the AC voltage connections to generate AC voltage, and a grid voltage with 50 Hz or 60 Hz is applied to the AC connections.

35. A use of the DC/AC converter according to claim 1, as a DC/AC converter in an island operation.

36. A use of the DC/AC converter according to claim 11, as a DC/AC converter in an island operation.

37. A use of the DC/AC converter according to claim 28, as a DC/AC converter in an island operation.

38. A use according to claim 29, wherein:
the DC/AC converter is transformerless.

39. The use according to claim 29, wherein:
the DC/AC converter is transformerless.

40. The A DC/AC converter according to claim 3, wherein:
the AC voltage is a frequency grid voltage having a frequency of 50 Hz or 60 Hz.

41. The DC/AC converter according to claim 10, wherein:
said circuit arrangement provides a switch.

* * * * *